United States Patent [19]

Terao et al.

[11] Patent Number: 5,202,868
[45] Date of Patent: Apr. 13, 1993

[54] METHOD OF DISPLACING A BEAM CONVERGING POSITION AND APPARATUS THEREOF

[75] Inventors: Masatoshi Terao; Takeshi Ikegami; Kazumi Saburi; Hiroe Miyajima, all of Tokyo, Takashi Kato, Kawaguchi; Takashi Horinouchi, Kawasaki; Katsura Komiyama, Tokyo; all of Japan

[73] Assignee: Kyocera Corporation, Kyoto, Japan

[21] Appl. No.: 530,017

[22] Filed: May 23, 1990

[30] Foreign Application Priority Data

May 24, 1989 [JP] Japan .................................. 1-128981

[51] Int. Cl.⁵ .............................................. G11B 7/00
[52] U.S. Cl. ................................ 369/44.17; 369/44.11; 369/44.28
[58] Field of Search ............... 369/44.17, 44.22, 44.23, 369/44.24, 112, 111, 44.11, 32, 44.27, 44.28; 354/1; 350/6.4

[56] References Cited

U.S. PATENT DOCUMENTS

| | | | |
|---|---|---|---|
| 3,736,848 | 6/1973 | Tsuneta et al. | 354/1 |
| 4,118,109 | 10/1978 | Crawford et al. | 350/6.4 |
| 4,333,173 | 6/1982 | Yonezawa et al. | 369/44.23 |
| 4,414,684 | 11/1983 | Blonder | 350/6.4 |
| 4,464,741 | 8/1984 | Compaan | 369/112 |
| 4,482,986 | 11/1984 | Noda et al. | 369/112 |
| 4,515,447 | 5/1985 | Weimer et al. | 350/6.4 |
| 4,677,605 | 6/1987 | Abed | 369/49.23 |
| 4,761,774 | 8/1988 | Ishibashi et al. | 369/44.19 |
| 4,785,438 | 11/1988 | Mizunoe | 369/44.23 |
| 4,822,974 | 4/1989 | Leighton | 350/6.4 |
| 4,856,871 | 8/1989 | Van Sant | 364/122 |
| 4,969,137 | 11/1990 | Sugiyama et al. | 369/112 |

FOREIGN PATENT DOCUMENTS

| | | | |
|---|---|---|---|
| 164687A | 12/1985 | European Pat. Off. | 369/44.24 |
| 62-248139 | 10/1987 | Japan | 369/44.23 |
| 63-50921 | 3/1988 | Japan | 369/44.23 |
| 1-55754 | 3/1989 | Japan | 369/44.23 |

Primary Examiner—Tommy P. Chin
Assistant Examiner—Thai Tran
Attorney, Agent, or Firm—Spensley Horn Jubas & Lubitz

[57] ABSTRACT

A beam spot controlling method for controlling the beam-converging position by a light beam from an objective lens on a recording track of a recording medium comprising the steps of (a) rotating a tapered prism having an inclination-imparting portion capable of imparting an inclination to a light beam which enters the tapered prism for changing the inclination of the light beam incident on said objective lens for controlling the beam-converging position by the light beam; (b) causing a light beam to enter the tapered prisms; and (c) causing the light beam exiting from the tapered prism to enter the objective lens, and directing the exiting light beam onto the recording track of said recording medium, and an apparatus for performing the above beam spot controlling method.

23 Claims, 11 Drawing Sheets

METHOD OF DISPLACING A BEAM CONVERGING POSITION AND APPARATUS THEREOF

BACKGROUND OF THE INVENTION

1. Field of the Invention

The present invention relates to a beam spot controlling method for controlling the position onto which a spot of beam is projected on an optical recording medium such as an optical disk, a magneto-optical recording disk, and an optical card for use in an optical recording system in which data is optically written in and read out by spot irradiation, and an apparatus or actuator therefor.

2. Discussion of Background

In an optical recording system, it is necessary to use an objective lens to focus a laser beam and direct the beam onto the recording track of a recording medium in the form of a beam spot of minute diameter. For instance, in the case of a disk-shaped recording medium such as an optical disk and a magneto-optical recording disk (hereinafter referred to as the recording disk), the objective lens is moved in a radial direction of the recording disk as the recording disk is rotated, whereby the beam spot irradiation onto the desired recording track can be performed.

In a random access mode, the objective lens is first driven at high speed in such a manner that a laser beam gets rough access to the vicinity of the desired recording track, reading the track address, and getting fine access to the recording track, so that the laser beam performs spot irradiation on the desired recording track.

However, the width of the recording track is extremely small, and because there are limits to the precision of the shape of the recording track, to the positioning of the recording medium when it is installed, or to the driving of the objective lens, it is not possible to direct the light ray spot onto the recording track of the recording medium with any degree of accuracy by simply driving the objective lens mechanically. Accordingly, any deviation between the spot and the recording track position must be detected as an error signal, and the tracking direction must be finely controlled to direct the spot onto the recording track. In addition, it is also necessary to finely control the focusing direction so that the focal point ends up on the recording track. Various types of such tracking control systems are proposed, for instance, one for an optical information reading-out apparatus as described in U.S. Pat. No. 4,302,830.

FIG. 16 is a perspective view of a conventional beam spot control apparatus in the explanation of the movable operating parts thereof. FIG. 17 is a cross-sectional view of the movable operating parts, which are fitted by a sliding shaft. In these figures, an objective lens 13 is mounted on a supporting member 81 which is referred to as a bobbin. A focusing coil 25 is wound around the peripheral surface of the supporting member 81, and tracking coils 27 are also attached around the supporting member 81 as shown in FIGS. 16 and 17. When a signal current is caused to flow through the focusing coil 25 and the tracking coils 27, power is generated between the supporting member 81 and a separate electro-magnetic circuit (not shown), so that the supporting member 81, which is fitted with a sliding shaft 87 through a fitting hole 85, is turned around the sliding shaft 87 and accordingly the objective lens 13 is driven in a tracking direction Tr. In addition, the objective lens 13 is driven in a focusing direction Fo by the vertical sliding movement of the supporting member 81 along the sliding shaft 87.

To maintain the weight balance in this type of beam spot controlling apparatus, an equivalent weight balancer 83 is provided on the side opposite to the objective lens 13, but in actual manufacture, it is impossible to avoid the creation of a weight imbalance around the sliding shaft 87. For this reason, the supporting member 81 is subject to displacement in the tracking direction Tr as the result of acceleration during the high speed tracking access, so that vibrations are induced in the supporting member 81. Even during the fine access action, the thus induced vibrations remain, which cause a delay in the access time. In particular, because the objective lens 13 and the balancer 83, which are both heavy, are positioned at a location separated from the sliding shaft 87 which is the center of rotation, the moment of inertia is large and even a small weight imbalance tends to cause the objective lens 13 to swing. In addition, the balancer 83 is essentially a useless object, so that it is desirable to eliminate it or to provide a light unit to lighten the weight of the actuator.

Furthermore, as shown in FIG. 16, when tracking is controlled by moving the objective lens 13 horizontally, the problem arises that even when tracking is obtained, the reflected laser beam from the recording medium is displaced parallel to the incident laser beam and an apparent tracking error is produced. FIGS. 18A and 18B are explanatory figures showing this situation. FIG. 18A shows an objective lens O.L. at a neutral point and the center of the optical intensity distribution of an incident beam 101 coinciding with the optical axis of the objective lens O.L. Generally the center of the light intensity distribution of a beam is the center of the beam. Therefore, the center of the light intensity distribution of a beam is hereinafter simply referred to as the center of the beam or the center of an incident beam. In the case as shown in FIG. 18A, the center of the incident beam 101 exiting from a laser source coincides with the center of a beam 103, which is focused by the objective lens O.L. and reflected from the surface of the recording disk. The reflected beam 103 is reflected by a mirror M, passes through a beam splitter B.S. and enters a detection system including a quadrant photodiode, in which error signals and data signals are detected. The reflected beam 103 enters the center of the quadrant photodiode P.D., and when tracking is obtained, no bias is produced in the amount of beam directed to the quadrant photodiode P.D. because the intensity of beam is evenly distributed from the center of the laser beam. If the tracking deviates from the center of the track, a deviation is produced from the center of the light intensity distribution, and the amount of the deviation is detected as an error signal. Here it is supposed that the objective lens O.L.. is displaced by a distance, $\Delta x$, from the neutral position, for instance, to compensate for the deviation of the recording track, and the beam-converging position on the disk is moved by the distance $\Delta x$ only. At this time, the incident beam 101 enters at a position with its center shifted by the distance $\Delta x$, from the optical axis of the objective lens O.L., so that the center of the incident beam 101 and the center of the reflected beam 103 remain parallel, but separate by a distance $\Delta L_2$ ($=2\Delta x$). Therefore, the center of the reflected beam 103 is deviated from the right center by this distance and enter the quadrant photodiode. The result is that in spite of the fact that accurate tracking has been obtained with an equal light intensity distribution from the center of the laser beam and spot formation has been performed correctly on the recording track, the detector reacts as though a tracking error has occurred. If the beam spot control is performed in such a situation, the beam spot is formed at a position shifted from the center of the recording track. Accordingly, if the amount of this apparent tracking error is not offset, the quality of the recording and reproduction of the information is significantly reduced.

In order to compensate the amount of the apparent tracking error, a method has been proposed in Japanese Laid-Open Patent Application 58-9228 by which a beam is directed to an objective lens, and the reflection surface of a galvanomirror which directs the reflected beam to a tracking error detection system is made to coincide with the back focal point of the objective lens. However, since the back focal distance of the objective lens is extremely small, for instance, about 2 to 5 mm, it is almost impossible to design the system to place the galvanomirror at that position.

In Japanese Laid-Open Patent Application 61-160841, a method is disclosed by which a rotary prism acting as a mirror is driven eccentrically so that the light beam is always passes through the back focal point of the objective lens. However, with this method a large apparatus is unavoidable.

In addition, in these two methods it is difficult to precisely maintain the attitude of the mirror when an optical head accesses the recording disk at high speed.

The use of the property of a tapered prism that the inclination of the light beam exiting therefrom can be changed by turning the prism has been proposed in order to scan a light beam or to change the optical axis of a light beam, for instance, in U.S. Pat. Nos. 2,975,668, 3,297,395, 3,378,687, 3,736,848, 3,827,787, and 4,118,109. However, these prior art references neither teach or suggest the application of that property to a beam spot irradiation apparatus.

SUMMARY OF THE INVENTION

It is therefore an object of the present invention to provide a beam spot controlling method for controlling the position onto which a spot of beam is projected on an optical recording medium, which can ameliorate the swinging of an objective lens from the imbalance thereof which occurs during the high speed access to the track of the optical recording method thereof.

Another object of the present invention is to provide an apparatus for performing the above beam spot controlling method.

A further object of the present invention is to provide a beam spot controlling method for controlling the position onto which a spot of beam is projected on an optical recording medium, which can prevent the occurrence of an apparent tracking error.

Still another object of the present invention is to provide a beam spot controlling apparatus capable of preventing the occurrence of an apparent tracking error.

These objects are achieved in the present invention by the provision of a beam spot controlling method and an apparatus for a beam spot irradiated onto a recording track for an optical recording medium from an objective lens comprising the steps of: (a) causing a light beam to enter the objective lens through a tapered prism, (b) changing the inclination of the light beam which enters the objective lens by turning the tapered prism, thereby controlling the converging position of the light beam.

In the present invention, the converging position of the spot formation in the tracking direction of the recording medium can be controlled by turning the tapered prism, without moving the objective lens horizontally. Furthermore, by positioning the tapered prism in such an attitude that the portion of the tapered prism which changes the inclination of the light beam that enters the objective lens coincides with or is situated in close vicinity with the back focal point of the objective lens, the apparent tracking error can be restrained to a small amount, and in principle can be made equal to zero.

In addition, the above objects of the present invention can be achieved by the provision of a beam spot controlling apparatus comprising an objective lens which directs light onto a recording medium and can be driven in a focusing direction; and a tapered prism which is rotatably provided in front of the objective lens and can change the inclination of a light beam incident on the objective lens, whereby the weight imbalance of a movable section with respect to the rotary axis thereof can be minimized, and the swinging of the movable section when high speed tracking access is undertaken can be prevented. Thus, a high speed and light-weight beam-spot-controlling apparatus can be provided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
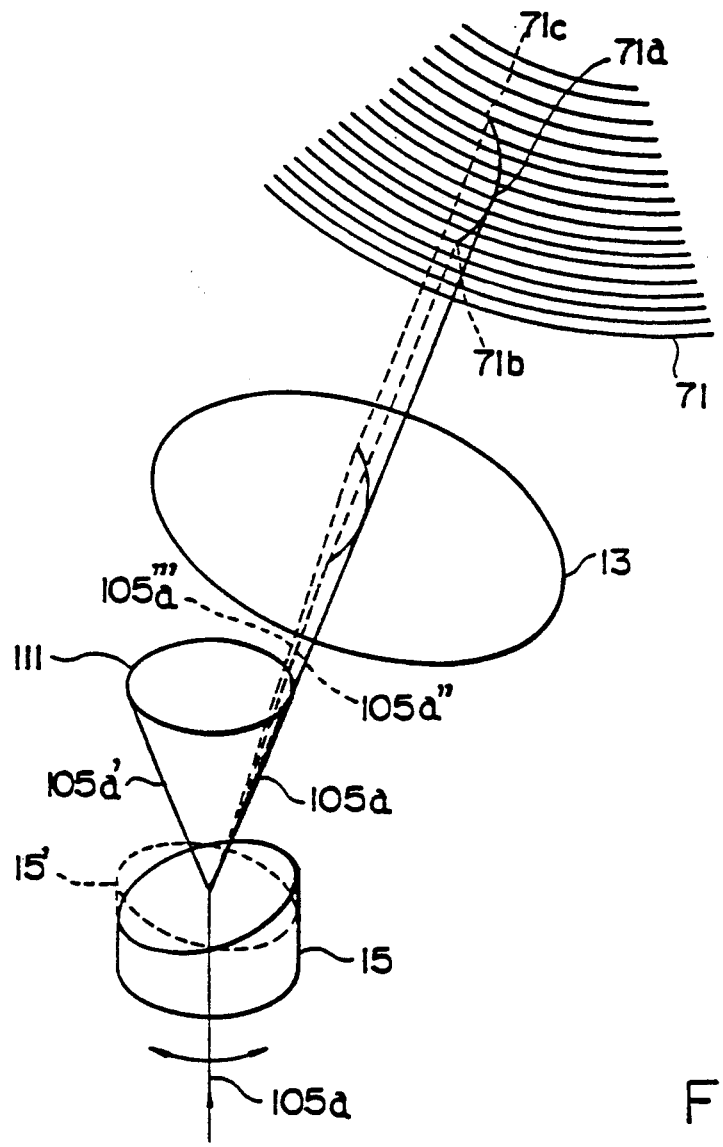
FIGS. 1 and 2 are explanatory diagrams showing the principle of a beam-spot-controlling method according to the present invention.

FIG. 1 shows a schematic illustration in explanation of the principle of the present invention. A laser beam travelling in a direction 105a enters the bottom surface of a tapered prism 15 at a right angle thereto and emits therefrom with an inclination due to the refraction power of the prism. The magnitude of the inclination is determined by the angle α formed by the bottom surface and the upper surface of the tapered prism 15 (refer to FIG. 3) and the refraction index of the tapered prism 15. As the tapered prism 15 is turned, the inclination direction of the light beam which emits from the tapered prism 15 changes, so that the direction 105a of the light beam is changed, forming a locus 111 as shown in FIG. 1. Reference numeral 105a' indicates the direction of the light beam which emits from the tapered prism 15 when the tapered prism 15 is positioned, with a rotation of 180°, with a posture 15' indicated by the broken lines.

In the present invention, the tapered prism 15 is not caused to make one revolution, but is turned slightly so that the inclination of the light beam is slightly changed by the tapered prism 15 and the light beam is directed onto an objective lens 13. When the center of the light beam with the inclination 105a coincides with the optical axis of the objective lens 13, and a point 71a on a recording track formed on a recording disk 71 is subject to spot irradiation by the convergence of the light beam thereon by the objective lens 13, this state is referred to as the state in which the light beam is directed onto a neutral point. When the tapered prism 15 is slightly turned from the above state, the inclination of the center of the light beam which emits from the tapered prism changes, for instance, like sequences of $105a'' \rightleftarrows 105a \rightleftarrows 105a$, and the inclination of the incident light beam onto the objective lens 13 is also changed in accordance with the above changes in the inclination. Thus, the spot irradiation point on the disk 71 through the objective lens 13 is moved in the direction of the diameter of the disk 71, that is, in the tracking direction, $71b \rightleftarrows 71a \rightleftarrows 71c$, as illustrated in FIG. 1, whereby accurate beam spot irradiation can be performed on the recording track of the recording medium.

Figure 2:
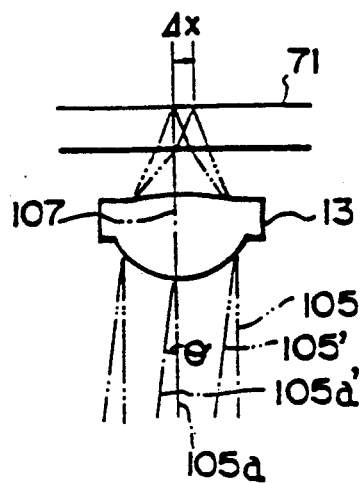

FIG. 2 is a diagram for explaining a tracking control mechanism by causing an inclined light beam to enter the objective lens 13. When the center 105a of the incident light beam 105 coincides with the optical axis 107 of the objective lens 13, the light beam 105 is located at a neutral position. When the center line of the light beam 105 is inclined by an angle θ with respect to the optical axis 107 of the objective lens 13 to be located at a position 105a' by the rotation of the tapered prism 15, the beam-converging position on the disk 71 through the objective lens 13 is moved by a distance Δx (=f·tanθ, where f is the focal length of the objective lens 13).

Figure 3:
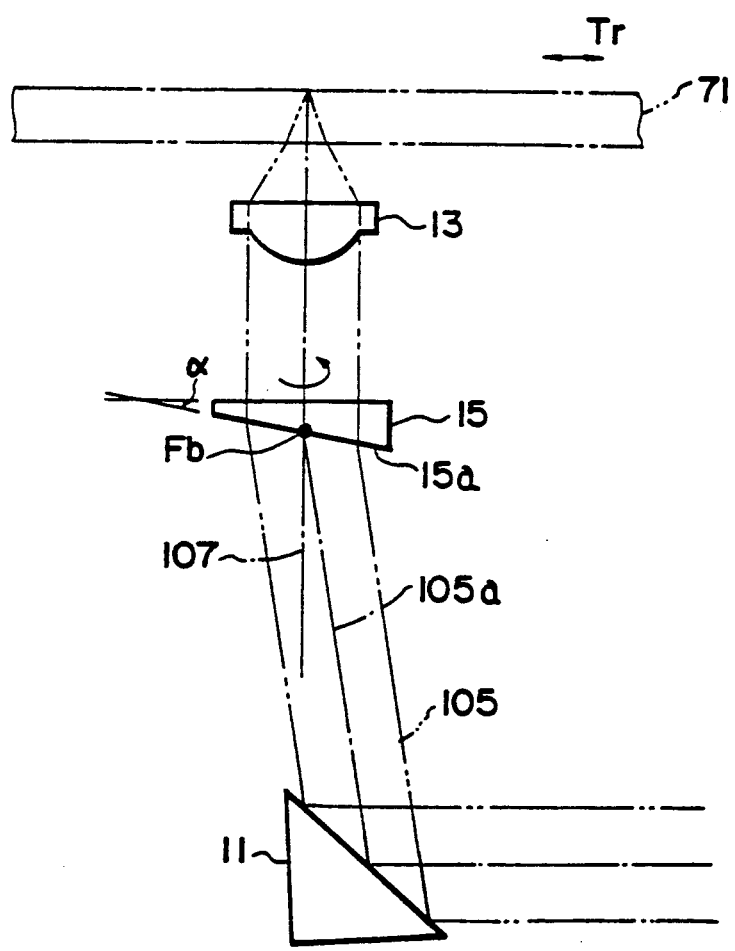
FIGS. 3 and 4 are schematic diagrams in explanation of an optical system for use in the present invention.

FIG. 3 shows an example of an optical system for use in the present invention. In FIG. 1, a light beam is caused to enter the tapered prism 15 from the surface which is normal (i.e, at a right angle) to the axis of rotation of the tapered prism 15 for a better understanding of the principle of the present invention. By contrast, in the optical system shown in FIG. 3, the light beam is caused to enter the tapered prism 15 from an inclined surface 15a in order to make the axis of rotation of the tapered prism 15 parallel to the optical axis of the objective lens 13. On a recording disk 71 a spiral recording track or a recording track comprising a series of concentric circles is provided in the radial direction, and the tracking direction Tr is the radial direction. A light beam 105 from a light source (not shown) is reflected by a mirror 11 and caused to enter a tapered prism 15 at an angle inclined with respect to an optical axis 107 of the objective lens 13. Reference numeral 105a indicates a center line of the light beam 105. FIG. 3 shows the case where the tapered prism 15 is located at a neutral position. An inclination is imparted to the light beam which enters the tapered prism 15 by the refracting power of the tapered prism 15 so that the center line 105a of the light beam 105 substantially coincides with the optical axis 107 of the objective lens 13. In this case, when the tapered prism 15 is slightly turned, the amount of inclination of the light beam 105 imparted by the tapered prism 15 varies an extremely small amount, while, at the same time, the angle of inclination of the light beam 105 incident upon the objective lens 13 varies an extremely small amount. As shown in FIG. 2, when the optical axis of the objective lens 13 coincides with the center line 105a of the incident light beam 105, spot irradiation is performed on a spot on the disk 71 which is on the optical axis of the objective lens 13. When the incident light beam enters at an angle θ inclined with respect to the optical axis of the objective lens 13 as shown by the alternate long and short dashes line 105', the beam-converging position on the disk 71 is shifted in the tracking direction by a distance Δx. Thus, by controlling the degree of rotation of the tapered prism 15, the position on which the beam is converged by the objective lens 13 can be moved in the tracking direction (Tr) and made to follow the recording track. In this way, the tracking is driven only by the rotation of the tapered prism 15 and it is unnecessary to move the objective lens 13 horizontally. However, in this method the light beam must be inclined with respect to and be directed at the tapered prism 15. As a result, the adjustment of the inclination of the mirror 11 must be done precisely. Also, because the light beam must not cross other members in the optical path from the mirror 11 to the tapered prism 15, there are cases where some restrictions are placed on the design of the apparatus or the apparatus must be large-sized. Accordingly, these points are improved in an optical system shown in FIG. 4, while maintaining the superior character of the optical system of FIG. 3.

Figure 4:
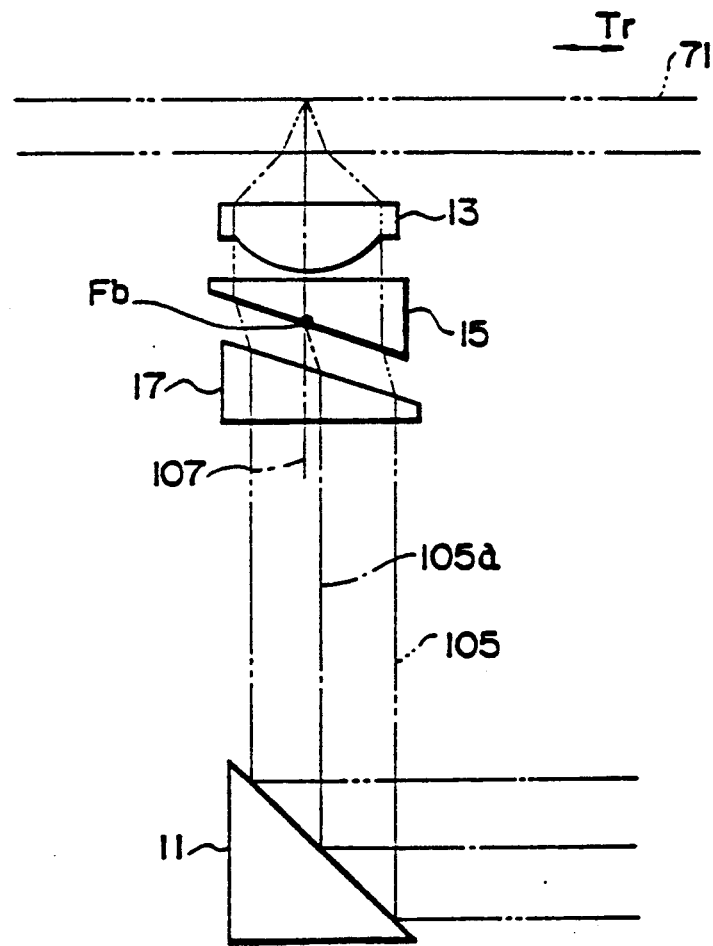

In the optical system shown in FIG. 4, an additional tapered prism 17 is securely positioned in front of the tapered prism 15. Hereinafter the tapered prism 15 is referred to as the first tapered prism, and the additional tapered prism 17 as the second tapered prism. These tapered prisms 15 and 17 are respectively positioned in a mutually compensating direction in which the inclination of the light beam incident upon the pair of the tapered prisms 15 and 17 is compensated. More specifically, the term "mutually compensating direction" means that the refracting direction of a light beam incident upon each tapered prism is opposite, so that when rays of light which are parallel or substantially parallel to the optical axis of the objective lens 13 are caused to enter the pair of tapered prisms 15 and 17, rays of light which are parallel or substantially parallel to the optical axis of the objective lens 13 are emitted therefrom.

In FIG. 4, the configuration is shown where the first and second tapered prisms 15 and 17 of exactly the same performance are positioned in such a fashion that their inclined surfaces are parallel. When the light beam 105 is caused to enter the second tapered prism 17 in parallel with the optical axis of the objective lens 13, the light beam 105 is inclined by the second tapered prism 17, enters the first tapered prism 15, and a light beam which is substantially parallel to the optical axis 107 of the objective lens 15 exits the first tapered prism 15. Therefore, it is possible to direct the light beam 105 to the objective lens 13 by causing the light beam to be perpendicularly reflected by the mirror 11. Furthermore, by positioning the first and second tapered prisms 15 and 17 in close proximity, the distance over which the light beam is inclined can be shortened. Therefore restrictions on the design of the apparatus are reduced and a small apparatus is possible. In the above explanation, the first tapered prism 15 rotates and the second tapered prism 17 remains fixed. However, it is also possible to reverse this so that the second tapered prism 17 rotates and the first tapered prism 15 remains fixed. The position of the beam spot can still be controlled in the same way.

As shown in FIGS. 3 and 4, the point P at which the optical center line 105a of the light beam 105 incident upon the rotatable first tapered prism 15 is inclined (hereinafter referred to as the inclination-imparting point P), specifically, the incident position at which the optical center line 105a strikes the inclined surface of the first tapered prism 15, is caused to coincide with the back focal point Fb of the objective lens 13.

Figure 5:
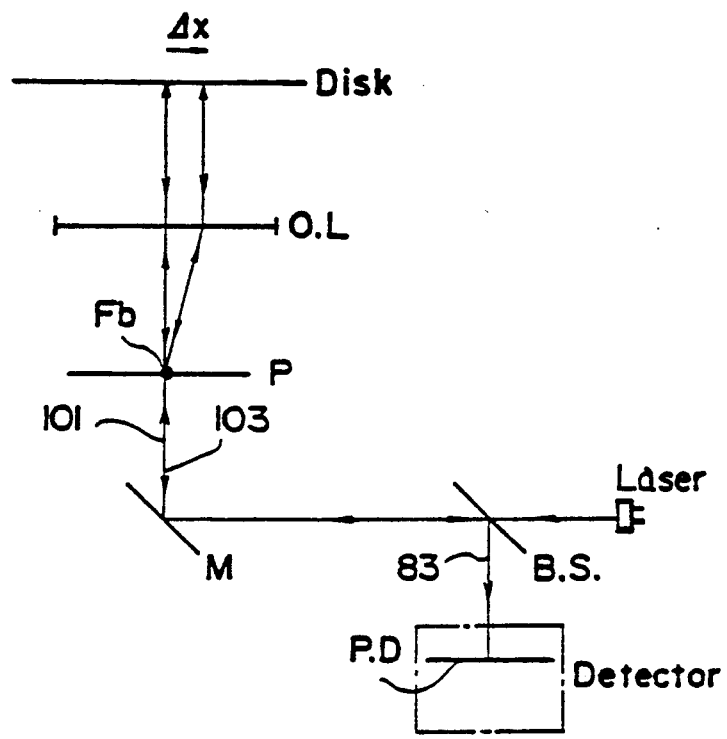
FIGS. 5 and 6 are explanatory diagrams of an apparent tracking error.

FIG. 5 is a schematic diagram showing the path of the light beam reflected from the disk in the above-mentioned state. Now it is supposed that the center line 105a of the light beam 105 passe through the center of the objective lens O.L. and irradiates the recording disk, the tracking is controlled to follow the recording track, and the beam-converging position is displaced by a distance Δx. In this case, if the inclination-imparting point P and the back focal point Fb coincide, in principle the center of an incident light beam 101 and the center of a reflected light beam 103 also coincide. Accordingly, the reflected light beam 103 is led to a quadrant photodiode PD in the center without any shift in the light intensity distribution, and the apparent tracking error a explained in FIGS. 18A and 18B is not produced.

Figure 18A:
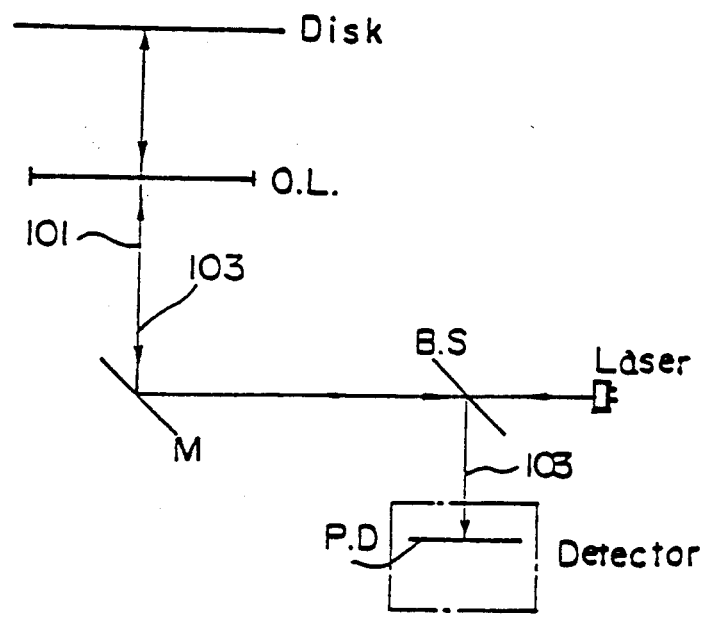
FIGS. 18A and 18B are schematic diagrams in explanation of the apparent tracking error of the conventional beam-spot-controlling apparatus.
Figure 18B:
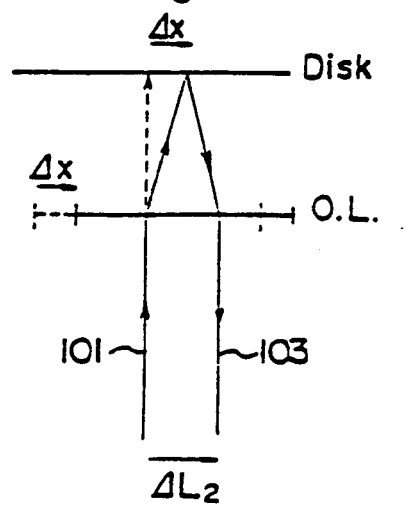

In a method in which the beam-converging position is moved in the tracking direction by causing a light beam to enter the objective lens at an angle inclined thereto, without moving the objective lens horizontally, even in the case where the inclination-imparting point P and the back focal point of the objective lens do not coincide precisely, it is possible to reduce the apparent tracking error caused by the movement of the intensity centers of the incident light beam and the reflected light beam to a greater extent than in the method shown in FIGS. 18A and 18B in which the objective lens is moved horizontally.

Figure 6:
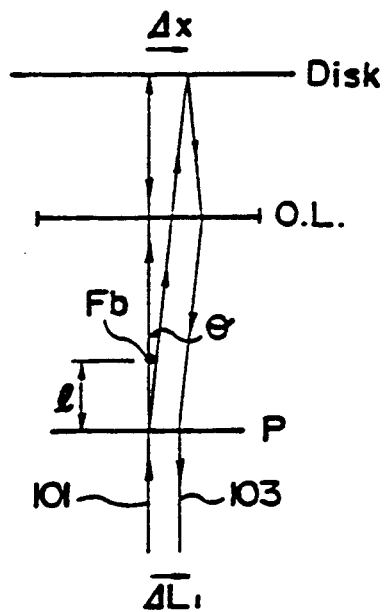

FIG. 6 is a diagram in explanation of the apparent tracking error. In the case where the back focal point Fb and the inclination-imparting point P do not coincide, if the beam-converging position is displaced from a neutral point by a distance Δx, the center of the reflected light beam 103 is shifted by a distance $\Delta L_1$ from the center of the incident light beam 101. If the distance between the back focal point Fb and the inclination-imparting point P is taken as l, and the angle of incidence of the incident light beam 101 onto the objective lens O.L. as $\theta$, the shifting amount can be represented as $\Delta L_1 = 2l \cdot \tan\theta$. In FIG. 18B, $\Delta L_2$ is $2 \cdot \Delta x$, so if the beam-converging position moves 30 μm, then $\Delta L_2 = 60$ μm. By contrast, in the present invention, when l is 1 mm and the focal length of the objective lens is 3 mm, and $\theta = 0.57°$, then $\Delta L_2 = 22$ μm, showing that the apparent tracking error can be suppressed to a very small value. It is, of course, desirable to have l=0, but within the required precision range it is possible to have a large degree of freedom in the design.

Figure 7:
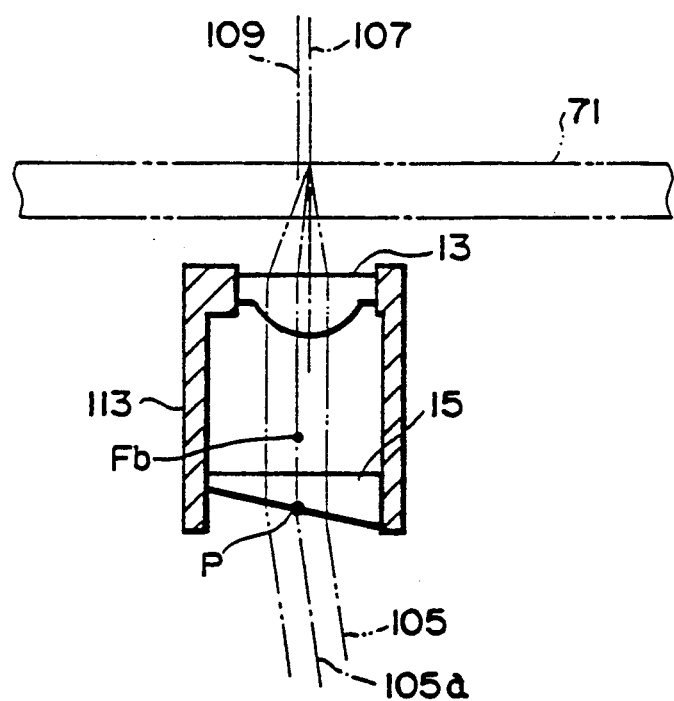
FIG. 7 is a schematic diagram in explanation of another optical system for use in the present invention.

FIG. 7 is a diagram in explanation of another optical system for use in the beam spot controlling method according to the present invention. As in the case shown in FIG. 3, when the light beam 105 enters the tapered prism 15, an inclination is imparted to the incident light beam 105, so that a spot is formed on the disk 71. In FIG. 7, the incident light beam 105 enters the objective lens 13, with the center 105a of the incident light beam being positioned eccentrically with respect to the optical axis 107 of the objective lens 13, so that a spot is formed on the disk 71 on the optical axis of the objective lens 13. The objective lens 13 and the tapered prism 15 are integrally held by a supporting member 113 and the optical axis 107 of the objective lens 13 is eccentric with respect t the axis of rotation 109 of the supporting member 113. When the supporting member 113 is slightly turned around the axis of rotation 109, the direction of the inclination imparted to the incident light beam 105 is changed by the tapered prism 15, and accordingly the angle of incidence of the incident light beam 105 onto the objective lens 13 is also changed, so that the beam spot irradiation position is moved on the disk 71. In addition, since the axis of rotation 109 of the objective lens 13 is eccentric with respect to the optical axis 107 of the objective lens 13, the optical axis 107 is rotatably moved, so that the beam-converging position of the beam spot is also moved on the disk 71. Thus, in the above-mentioned optical system, in addition to the shifting of the beam-converging position caused by the changes in the inclination of the incident light beam onto the objective lens 13 as explained with reference to FIGS. 3 and 4, the shifting of the beam-converging position caused by the horizontal movement of the optical axis 107 due to the eccentric rotation of the objective lens is obtained, so that a large amount of the shifting of the beam-converging position can be obtained by a relatively small amount of rotation of the supporting member 113. In the method of causing a light beam to enter the objective lens 13 with the incident direction thereof being inclined with respect to the optical axis of the objective lens 13, and accordingly at an angle deviated from the optical axis of the objective lens 13, a limitation is imposed on the magnitude of the incident angle obtained due to the aberration of the objective lens 13 and other factors. However, by additional use of the shifting of the beam-converging position by the eccentric rotation of the objective lens 13 as mentioned above, a large tracking amount can be secured without impairing other performance characteristics thereof. For instance, when the objective lens 13 has a focal length of 3.0 mm and the tapered prism 15 is positioned in such a fashion that the inclination-imparting point of the tapered prism 15 is positioned at the back focal point of the objective lens 13, if the inclination of the incident light beam onto the objective lens 13 is changed to 0.57°, that is, if the tapered prism 15 has a refractive index of 1.76 and a taper angle of 17° and the tapered prism 15 is turned by an angle of about 2°, a shifting amount of about 20 μm can be obtained in the tracking direction. In this case, if the objective lens 13 is positioned with the optical axis thereof situated with an eccentric deviation of about 500 μm from the axis of rotation thereof, a shifting amount of 17 μm (sin2°×500 μm) in the tracking direction can be added to the above-mentioned shifting amount.

The apparent tracking error as shown in FIG. 18B is produced by shifting the beam-converging position in the tracking direction by the eccentric rotation of the objective lens 13. However, since the shifting of the beam-converging position in the tracking direction by the inclined incidence of the light beam is utilized in combination with the above-mentioned shifting, the apparent tracking error can be reduced. Furthermore, as shown in FIG. 7, the apparent tracking error can be reduced by positioning the tapered prism 15 in such a configuration that the inclination-imparting point P is situated away from the back focal point Fb of the objective lens 13 by a distance corresponding to the eccentricity amount of the objective lens 13.

Figure 8:
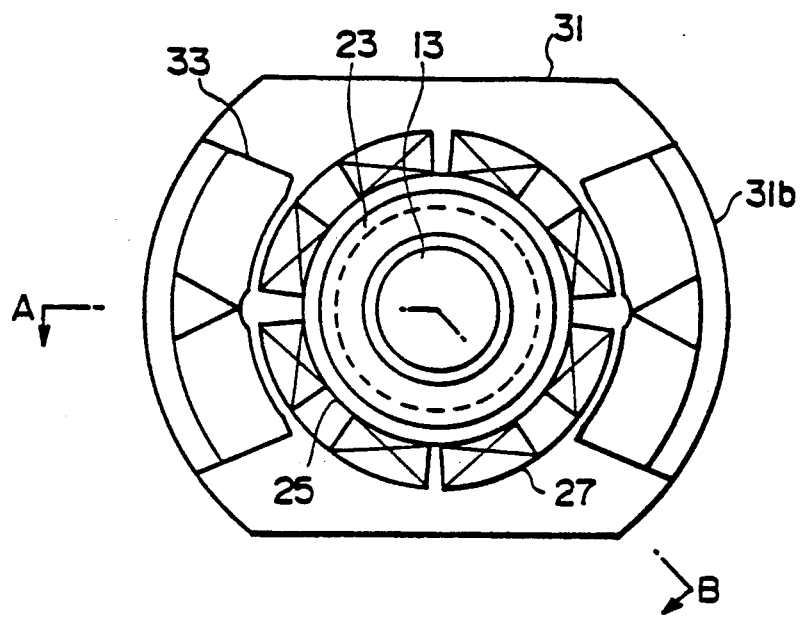
FIG. 8 is a schematic plan view of an embodiment of a beam-spot-controlling apparatus according to the present invention.
Figure 9:
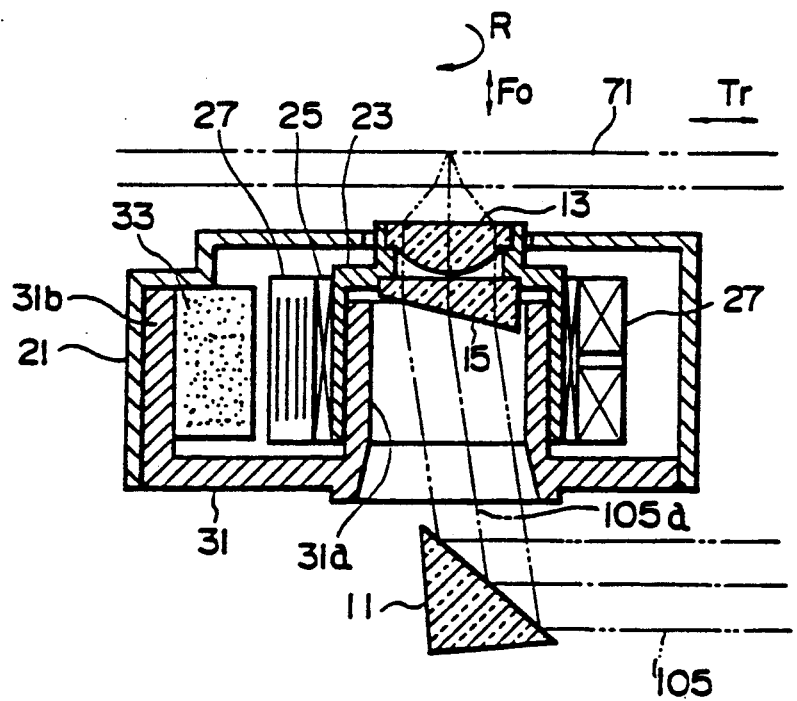
FIG. 9 is a schematic vertical cross-sectional view of the beam-spot-controlling apparatus shown in FIG. 8.

FIGS. 8 and 9 show an embodiment of a beam-spot-controlling apparatus according to the present invention. The optical system illustrated in FIG. 3 is used in this embodiment and the objective lens 13 and the tapered prism 15 are driven as an integrated unit.

FIG. 8 is a plan view of this apparatus with a housing 21 shown in FIG. 9 removed.

FIG. 9 is a vertical cross-sectional view of this apparatus taken on line A—center- B in FIG. 8.

Figure 16:
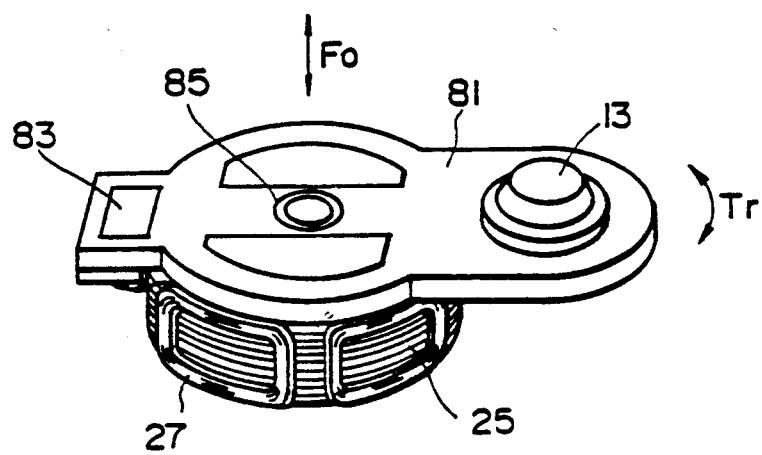
FIG. 16 is a schematic perspective view of a conventional beam-spot-controlling apparatus.
Figure 17:
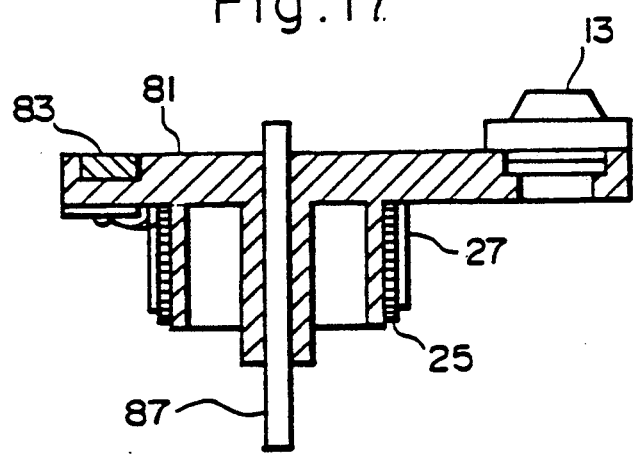
FIG. 17 is a schematic vertical cross-sectional view of the conventional beam-spot-controlling apparatus shown in FIG. 16 in which a sliding shaft thereof is in the fitting state.

In these figures, a yoke 31 including a cylindrical upright portion 31a and a peripheral wall portion 31b is secured to the housing 21. A permanent magnet 33 is incorporated in the yoke 31, that the yoke 31 also functions as a magnetic circuit. A cylindrical optical system supporting member 23 fits in the the upright portion 31a of the yoke 31. The objective lens 13 and the tapered prism 15 are secured to the optical system supporting member 23. The tapered prism 15 is positioned in such a fashion that the inclination-imparting point thereof is situated at the back focal point of the objective lens 13. The optical system supporting member 23 can slide vertically on the cylindrical upright portion 31a and move forward and backward in the focusing direction Fo of the objective lens 13. Also as shown by the arrow R in FIG. 9, the optical system supporting member 23 can rotate around the axis of the cylindrical upright portion 31a. In other words, the cylindrical upright portion 31a functions as a rotating and sliding shaft of the optical system supporting member 23. A focusing coil 25 is coiled around the peripheral surface of the optical system supporting member 23 and a tracking coil 27 is mounted on the cylindrical optical system supporting member 23 as shown in FIG. 16. When a signal current is supplied to the focusing coil 25, (i) the magnetic circuit comprising the permanent magnet 33 and the yoke 31, and (ii) the focusing coil 25 constitute a linear motor, and the optical system supporting member 23 is driven in the focusing direction Fo in response to the signal current, so that the beam-converging position (focal point) on an optical disk 71 can be always controlled by the objective lens 13.

The tracking coil 27 is wound around and secured to the outer peripheral surface of the optical system supporting member 23 so that the vertically-oriented side of the coil flux intersects the magnetic flux from the permanent magnet 33. When a signal current is supplied to the tracking coil 27 the tracking coil 27 and the magnetic circuit comprising the permanent magnet 33 and the yoke 31 constitute a rotary motor, and the optical system supporting member 23 is rotated in response to the signal current. The coil winding system and drive principles of the focusing coil 25 and the tracking coil 27 are basically the same as for a conventional actuator (refer to FIG. 16).

In the same manner as for the optical system shown in FIG. 3, the light beam 105 from a light source (not shown) is reflected by the mirror 11, and directed to the tapered prism 15 at an angle inclined relative to the optical axis of the objective lens 13. Reference numeral 105 indicates the center of the light beam 105. FIG. 3 and FIG. 6 show the case where the tapered prism 15 is on a neutral point and the direction of the light beam incident upon the tapered prism 15 is changed by the refractive power of the tapered prism 15 so that the center 105a of the light beam 105 coincides with the optical axis 107 of the objective lens 13. In this case, when the tapered prism 15 is rotated, the direction of the light beam 105 imparted to the light beam 105 by the tapered prism 15 is slightly changed. At the same time, the angle of inclination of the light beam 105 which enters the objective lens 13 also varies an extremely small amount. Accordingly, the position at which the beam from the objective lens 13 is formed as a spot can be moved in the tracking direction and made to follow the recording track by controlling the magnitude of the degree of rotation of the tapered prism 15. In this way the tracking is driven only by the rotation of the tapered prism 15 and it is unnecessary to move the objective lens 13 horizontally. In addition, since the inclination-imparting point of the tapered prism 15 is located at the back focal point of the objective lens 13, the occurrence of the apparent tracking error can be prevented. The objective lens 13 is moved forward and backward in the focusing direction Fo for the adjustment of the beam-converging position. However, since the objective lens 13 and the tapered prism 15 are integrally supported, their positional relationship or the distance between them does not change. Therefore, even if the objective lens 13 is moved for the focusing driving, the inclination-imparting point of the tapered prism 15 does not deviate from the back focal point of the objective lens 13.

Furthermore, although the displacement of the spot irradiation from the objective lens 13 is linked to the rotation of the tapered prism 15, the magnitude of the displacement can be less than the rotation of the tapered prism 15. Therefore, if by any chance the beam-spot-controlling apparatus swings in the tracking direction and the tapered prism 15 rotates from that swinging force, the adverse effects on the beam-spot-controlling are alleviated.

In addition, a configuration is obtained whereby the production of a weight imbalance in the rotating shaft can be minimized or substantially made zero by rotating the tapered prism 15 provided in front of the objective lens 12 on the optical axis thereof to control the tracking.

Accordingly, in comparison with the example of the conventional beam-spot-controlling apparatus, it is possible to prevent the swinging resulting from a weight imbalance produced by acceleration during high speed tracking access. Also because a large balancer is unnecessary, an overall reduction in size of the movable portions of the actuator can be realized. In practice, it is impossible to cause the weight imbalance to completely disappear because of variations in parts and in the manufacturing process. However, in this case, the mass point of each part is mostly concentrated on the rotating center so that the moment of inertial is small, and even when a certain amount of imbalance occurs, a swing is hardly be induced during high speed access.

Because the objective lens 13 and the tapered prism 15 are driven as an integrated unit, the construction is simple and an overall reduction in size of the apparatus can be realized.

Figure 10:
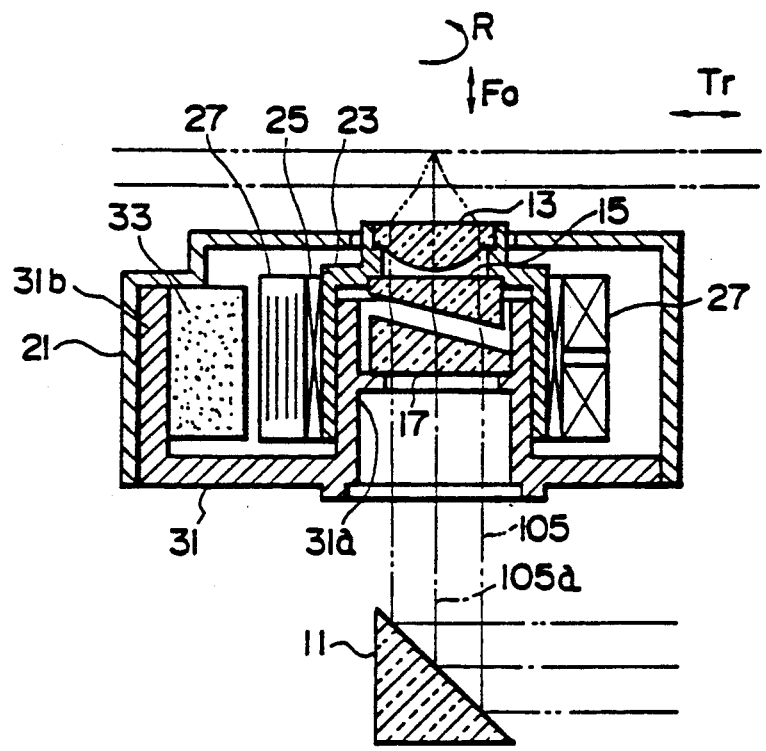
FIG. 10 is a schematic vertical cross-sectional view of another embodiment of a beam-spot-controlling apparatus according to the present invention.

FIG. 10 is a vertical cross-sectional view of another embodiment of a beam-spot-controlling apparatus according to the present invention, which corresponds to the vertical cross-sectional view of the beam-spot-controlling apparatus shown in FIG. 9. This apparatus utilizes the optical system illustrated in FIG. 4. In addition, the objective lens 13 and the first tapered prism 15 are secured to the same supporting member and driven as an integrated unit. The construction of the apparatus shown in FIG. 10 is the same as the apparatus shown in FIG. 9 with the exception that the second tapered prism 17 is secured to the hollow section of the yoke 31 in which there is provided an optical path, and is driven in the same manner as the apparatus in FIG. 9.

The light beam 105 from the light source is reflected perpendicularly from the mirror 11 and is inclined by the second tapered prism 17 with respect to the optical axis 107 of the objective lens 13. The thus inclined light beam 105 enters the first tapered prism 15 and is once again inclined by the second tapered prism 17 so as to be caused to substantially coincide with the optical axis of the objective lens 13. Thus, a beam spot is directed onto the optical disk 71 by the objective lens 13. As the first tapered prism 15 rotates, the amount of inclination imparted to the light beam is changed, and accompanying this, the position of the beam spot irradiation provided by the objective lens 13 is moved on the optical disk 71.

In this structure, the light beam 105 is merely reflected perpendicularly by the mirror 11, so that precise mounting of the mirror 11 is easily accomplished and the space required for mounting is small. In addition, the diameter of the hollow section of the yoke 31 can be made small. It is therefore possible to provide an overall small-size and light-weight apparatus.

Figure 11:
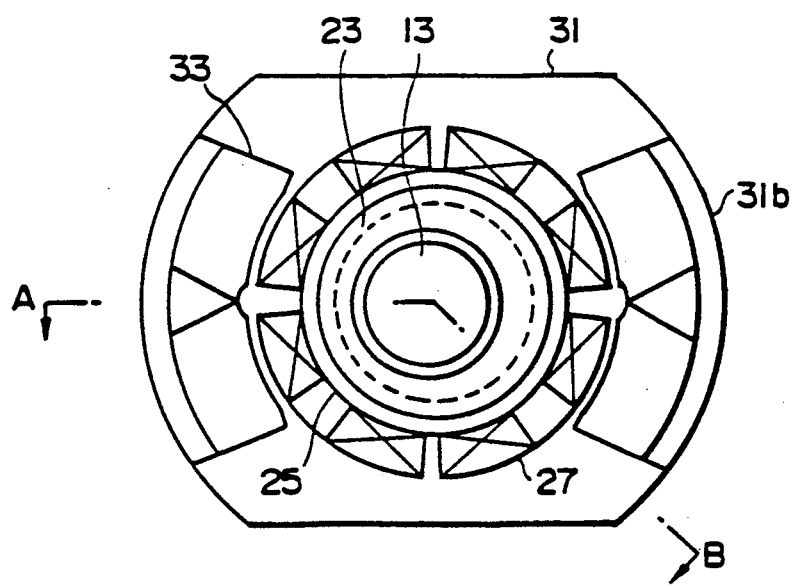
FIG. 11 is a schematic plan view of a further embodiment of a beam-spot-controlling apparatus according to the present invention.
Figure 12:
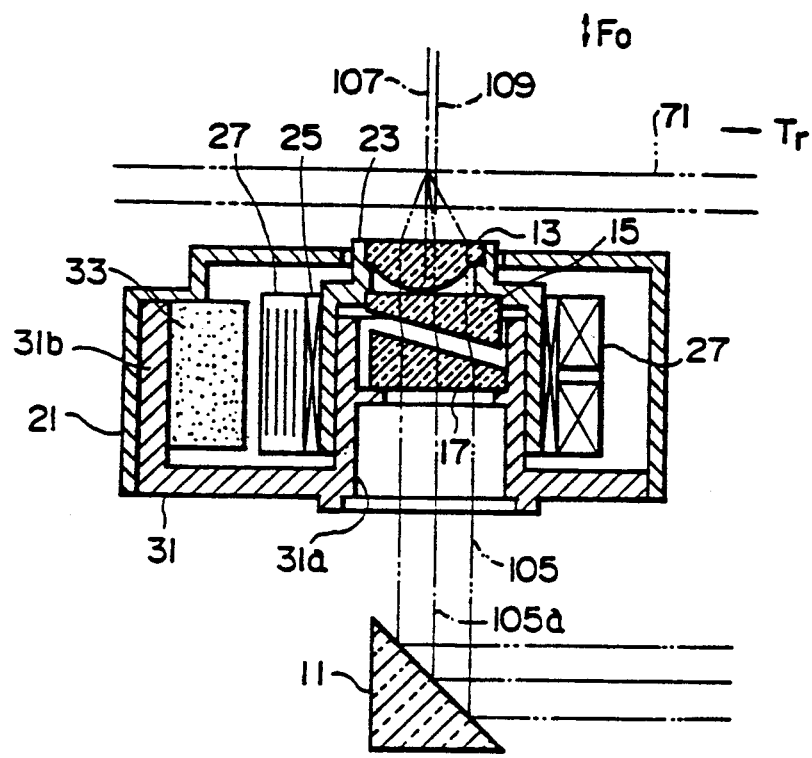
FIG. 12 is a schematic vertical cross-sectional view of the beam-spot-controlling apparatus shown in FIG. 11.

FIGS. 11 and 12 show a further embodiment of a beam-spot-controlling apparatus according to the present invention. This apparatus utilizes the optical system shown in FIG. 4, in which the second tapered prism 17 is added to the optical system shown in FIG. 7. Furthermore, the objective lens 13 and the first tapered prism 15 ar integrally driven in this apparatus.

FIG. 11 is a plan view of the apparatus shown in FIG. 12 from which the housing 21 is removed.

FIG. 12 is a vertical cross-sectional view of the apparatus taken on line A—center—B in FIG. 11. The beam-spot-controlling apparatus shown in FIGS. 11 and 12 is the same as the apparatus shown in FIGS. 8 and 10 except that the objective lens 13 is secured to the optical system supporting member 23 in such a fashion that the optical axis 107 of the objective lens 13 is positioned eccentrically with respect to the axis of rotation of the optical system supporting member 23 (or the axis of rotation of the objective lens 13). A slight rotation of the optical system supporting member 23 imparts (i) an inclination to the incident angle of the incident light beam onto the objective lens 13 and (ii) an eccentric rotation to the objective lens 13, so that the position of the optical axis 107 of the objective lens 13 is shifted in the horizontal direction and accordingly the position of the beam spot on the recording disk 71 is moved in the tracking direction thereon. Therefore a large amount of shifting of the beam spot position can be obtained by a relatively small amount of rotation angle of the optical system supporting member 23. In addition, the occurrence of the tracking error can be reduced by positioning the inclination-imparting point of the first tapered prism 15 at the back focal point Fb of the objective lens 13 as shown in FIG. 11.

Figure 13:
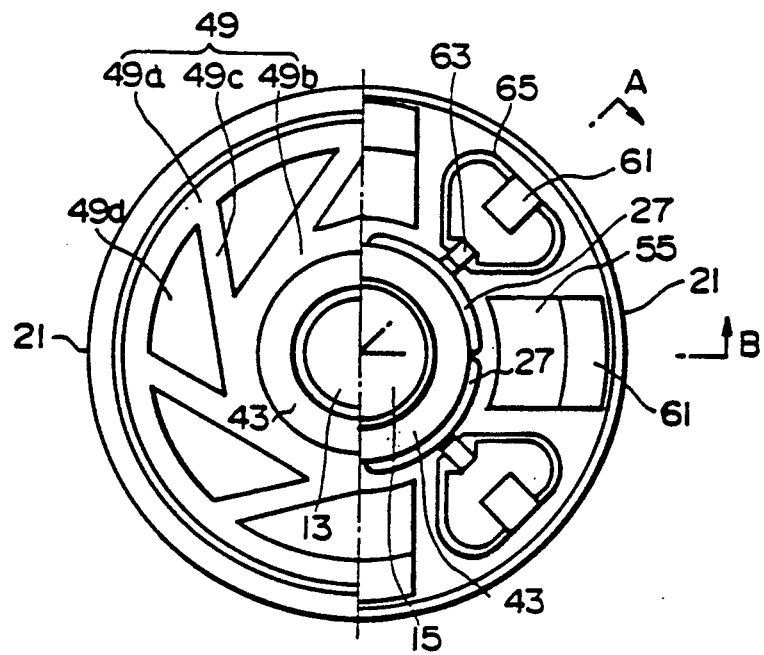
FIG. 13 is a schematic plan view of still another embodiment of a beam-spot-controlling apparatus according to the present invention.
Figure 14:
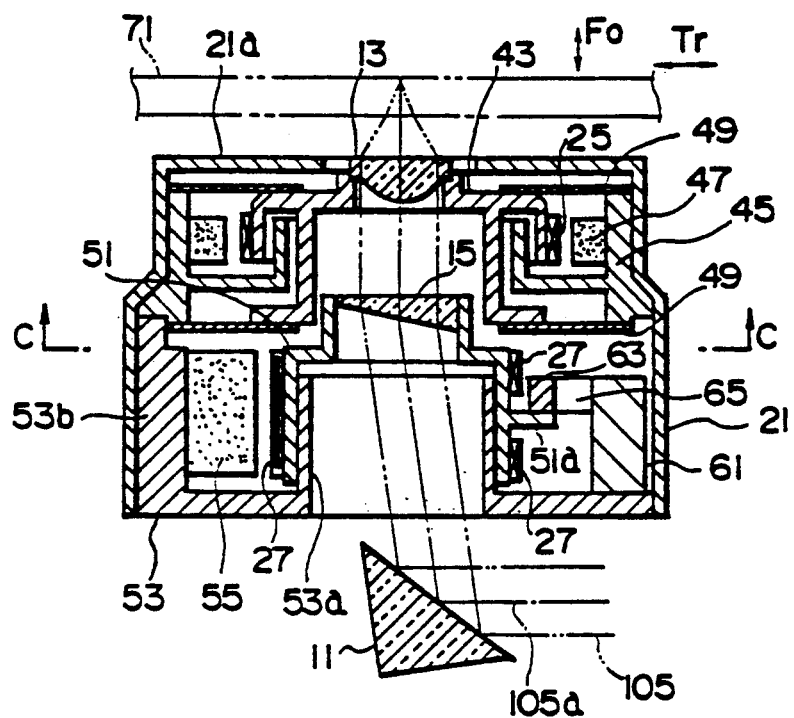
FIG. 14 is a schematic vertical cross-sectional view of the beam-spot-controlling apparatus shown in FIG. 13.

FIGS. 13 and 14 show still another embodiment of a beam-spot-controlling apparatus according to the present invention. This apparatus utilizes the optical system shown in FIG. 3. The objective lens 13 and the tapered prism 15 are each driven separately.

The left half of the FIG. 13 is a plan view of the apparatus shown in FIG. 14 with an upper portion 21a of the housing 21 removed, mainly to show the plan view of a plate spring 49.

The right half of FIG. 13 is a plan view of the members in the upper portion of the apparatus above line C—C in FIG. 14, with all the members except the tapered prism 15 and a supporting member 51 therefor removed, mainly to show the support mechanism and the rotation mechanism of the supporting member 51 for the tapered prism 15.

FIG. 14 is a schematic vertical cross-sectional view of the apparatus, taken on line A—center—B in FIG. 13.

In FIGS. 13 and 14, with the members having the same functions as those of the members shown in FIGS. 8 and 9, identical reference numbers are employed.

This embodiment of the beam-spot-controlling apparatus according to the present invention basically comprises (i) a focus actuator section 43 to 49, which supports and drives the objective lens 13 provided in the upper portion of the housing 21 and (ii) a tracking actuator section 51 to 65, which supports and drives the tapered prism 15 provided in the lower portion of the housing 21. Each of these actuator sections is independently driven. The optical disk 71 is provided as a recording medium.

An objective lens supporting member 43 for supporting the objective lens 13 is supported on an upper yoke 45 in such a fashion that objective lens supporting member 43 can be moved restrictively in the vertical direction (the focusing direction Fo) by a pair of upper and lower plate springs 49 and 49.

The plate springs 49 are in the form of a flat ring as a whole in their plan view. Cut-away portions 49d are formed between an outer peripheral section 49a and an inner peripheral section 49b connected over their entire circumference. The outer peripheral section 49a and the inner peripheral section 49b are connected by a rib 49c to form an almost flat plate. The outer edge of the outer peripheral section 49a is secured to an upper yoke 45 and the inner edge of the inner peripheral section is secured to the objective lens supporting member 45, allowing the plate springs 49 to be flexible only in the vertical direction, so that the objective lens supporting member 43 is supported so as to be driven in the focusing direction Fo. A magnet 47 is secured to the upper yoke 45 to form an electromagnetic circuit. When a signal current is applied to the focusing coil 25 wound around the outer peripheral surface of the cylindrical objective lens supporting member 43, a linear motor is formed, so that the objective lens supporting member 43 is driven for focusing in response to the applied signal current. This action is performed only in the upper focus actuator section 43 to 49, and has no effect on the lower focus actuator section 51 to 65.

A tapered prism supporting member 51 which supports the tapered prism 15 is rotatably fitted to a cylindrical upright portion 53a of a lower yoke 53 secured to the housing 21. The tapered prism 15 is positioned so that the incident position of the center of the incident light beam onto the inclined surface 15a of the tapered prism 15 coincides with the back focal point Fb of the objective lens 13 as shown in FIG. 3.

The tapered prism supporting member 51 is secured by a mounting projection 51a to a plurality of rubber dampers which are secured to the lower yoke 53. The rubber dampers each comprise a fixed column 61, a fixed terminal 63 and a rubber elastic body 65. By fabricating the rubber elastic body 65 so that it is thick in the vertical direction and thin in the horizontal direction, the tapered prism supporting member 51 is prevented from sliding vertically along the cylindrical peripheral surface of the lower yoke 53 and the tapered prism supporting member 51 is allowed to move only in its direction of rotation. The rubber dampers also have the function of maintaining the tapered prism supporting member 51 on the neutral point in the tracking direction.

A magnet 55 is mounted on a peripheral wall section 53b of the lower yoke 53. An external magnetic circuit is formed from the magnet 55 and the lower yoke 53. One of the coils running in the vertical direction of the tracking coil 27, which is secured to the peripheral surface of the tapered prism supporting member 51, is positioned so that it intersects the magnetic flux from the magnet 55. When a current signal is applied to the tracking coil 27, a rotary motor is formed from (i) an external magnetic circuit comprising the magnet 55 and the lower yoke 53 and (ii) the tracking coil 27, the tapered prism supporting member 51 is rotated. This action is performed in the lower tracking actuator section 51 to 65 only, and has no effect on the upper focus actuator section 43 to 49. Except for the fact that the two coils forming the magnetic field generating device, specifically, the focusing coil 25 and the tracking coil 27, are separately positioned on the supporting members 43 and 52, respectively, other factors such as the relationship between the coil winding systems and the electromagnetic circuits of the two coils 25 and 27, and the principles of the drive of the supporting members 43 and 51, are basically the same as for the conventional actuator as shown in FIG. 16.

By separately supporting and driving the objective lens 13 and the tapered prism 15 by different supporting members in this way, the interrelated effects between the focusing action and the tracking action can be eliminated. The mechanism of other operations and the control mechanism for positioning the beam spot and its effect are the same as for the embodiments shown in FIGS. 8 and 9.

Figure 15:
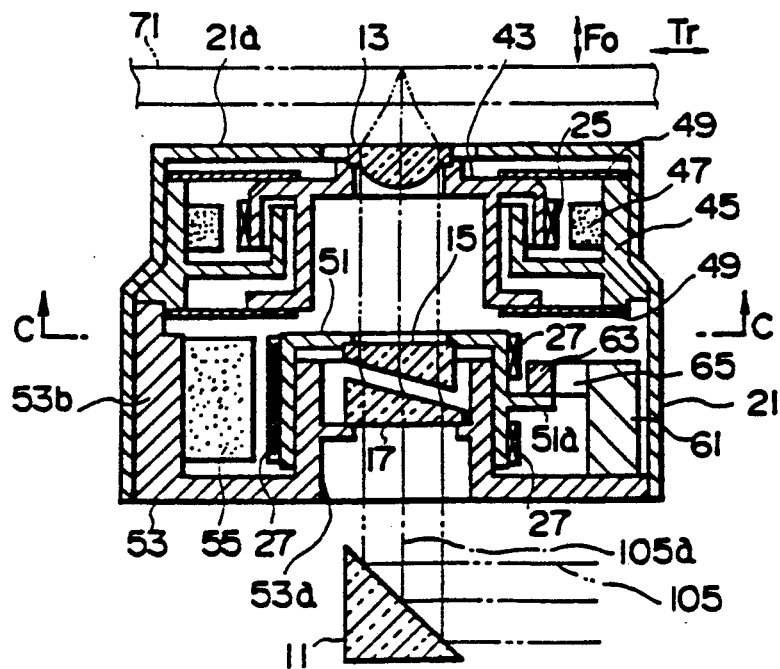
FIG. 15 is a schematic vertical cross-sectional view of a still further embodiment of a beam-spot-controlling apparatus according to the present invention.

FIG. 15 is a schematic vertical cross-sectional view of a still further embodiment of a beam-spot-controlling apparatus according to the present invention. This apparatus utilizes the optical system shown in FIG. 4. The objective lens 13 and the first tapered prism 15 are secured to separate supporting members and are driven separately. The construction of the apparatus shown in FIG. 15 is the same as the apparatus shown in FIG. 14 with the exception that the second tapered prism 17 is fixedly mounted in the hollow portion of the lower yoke 53 through which the light beam passes, and is driven in the same manner as the apparatus shown in FIG. 10. The second tapered prism 17 does not move relative to the housing 21.

The beam spot irradiation control for positioning the beam spot is the same as for the apparatus shown in FIG. 10, except that the objective lens 13 and the first tapered prism 15 are each driven separately.

According to the above embodiments of the present invention, a perpendicular light beam can be obtained with the mirror 11 and precise mounting of the mirror 11 is easily accomplished and the space required for mounting the mirror 11 is also small. In addition, the diameter of the hollow portion of the lower yoke 53 can be made small. It is therefore possible to provide an overall small-size and light-weight beam spot controlling apparatus.

What is claimed is:

1. A beam spot controlling method for controlling the beam-converging position of a light beam projected on a recording track of a recording medium by an objective lens having an optical axis, comprising the steps of:
    (a) rotating a tapered prism in a plane transverse to a light beam incident upon said tapered prism, said tapered prism having an inclination-imparting portion for imparting an inclination to a light beam incident on said tapered prism, said rotation changing the inclination of said light beam incident on said objective lens with respect to the optical axis of said objective lens thereby displacing the beam-converging position of said light beam;
    (b) causing a light beam to enter said tapered prism; and
    (c) causing said light beam exiting from said tapered prism to enter said objective lens, and directing said exiting light beam onto said recording track of said recording medium at a beam converging position displaced in accordance with the rotation of the prism.

2. The beam spot controlling method as claimed in claim 1, wherein said inclination-imparting portion of said tapered prism is positioned at or close to the back focal point of said objective lens.

3. A beam spot controlling method for controlling the beam-converging position of a light beam projected on a recording track of a recording medium by an objective lens having an optical axis, comprising the steps of:
    (a) rotating one of a pair of tapered prisms in a plane transverse to a light beam incident on said one of tapered prisms, each of said tapered prisms having an inclination-imparting portion for imparting an inclination to a light beam incident on said tapered prisms in a mutually compensating direction, said rotation changing the inclination of said light beam incident on said objective lens with respect to the optical axis of said objective lens thereby displacing the beam-converging position of said light beam;

(b) causing a light beam to enter said tapered prisms; and (c) causing said light beam exiting from said tapered prism to enter said objective lens, and directing said exiting light beam onto said recording track of said recording medium at a beam converging position displaced in accordance with the rotation of the prism.

4. The beam spot controlling method as claimed in claim 3, wherein said inclination-imparting portion ofone of said tapered prisms is positioned at or close to the back focal point of said objective lens.

5. A beam spot controlling method for controlling the beam-converging position of a light beam projected on a recording track of a recording medium by an objective lens having an optical axis, comprising the steps of:

(a) rotating (i) a tapered prism in a plane transverse to a light beam incident on said tapered prism, said tapered prism having an inclination-imparting portion for imparting an inclination to a light beam incident on said tapered prism, said rotation changing the inclination of said light beam incident on said objective lens with respect to the optical axis of said objective lens and (ii) said objective lens is such a fashion that the axis of rotation thereof is eccentric with respect to the optical axis of said objective lens, thereby displacing the beam-converging position of said light beam;

(b) causing a light beam to enter said tapered prisms; and (c) causing said light beam exiting from said tapered prism to enter said objective lens, and directing said exiting light beam onto said recording track of said recording medium at a beam converging position displaced in accordance with the rotation of the prism.

6. The beam spot controlling method as claimed in claim 5, wherein said inclination-imparting portion of one of said tapered prisms is positioned at or close to the back focal point of said objective lens.

7. A beam spot controlling method for controlling the beam-converging position of a light beam projected on a recording track of a recording medium by an objective lens having an optical axis, comprising the steps of:

(a) rotating (i) one of a pair of tapered prisms in a plane transverse to a light beam incident on said one of tapered prisms, each of said tapered prisms having an inclination-imparting portion for imparting an inclination to a light beam incident on said tapered prisms in a mutually compensating direction, said rotation changing the inclination of said light beam incident on said objective lens with respect to the optical axis of said objective lens, and (ii) said objective lens in such a fashion that the axis of rotation thereof is eccentric with respect to the optical axis of said objective lens, thereby displacing the beam-converging position of said light beam;

(b) causing a light beam to enter said tapered prisms; and (c) causing said light beam exiting from said tapered prism to enter said objective lens, and directing said exiting light beam onto said recording track of said recording medium at a beam converging position displaced in accordance with the rotation of the prism.

8. The beam spot controlling method as claimed in claim 7, wherein said inclination-imparting portion of one of said tapered prisms is positioned at or close to the back focal point of said objective lens.

9. A beam spot controlling apparatus for use with a recording medium, comprising:

(a) an objective lens movable in the focusing direction thereof for directing light onto the recording medium; and (b) a tapered prism disposed in front of said objective lens, said tapered prism having an inclination-imparting portion for imparting an inclination to a light beam incident on said tapered prism; and (c) means for rotating said tapered prism in a plane transverse to a light beam incident on said tapered prism to change the inclination of said light beam incident on said objective lens with respect to the optical axis of said objective lens thereby displacing the beam-converging position of said light beam.

10. The beam spot controlling apparatus as claimed in claim 9, further comprising an optical system supporting member which supports said objective lens and said tapered prism, and is positioned to allow (i) forward and backward movement in the focusing direction of said objective lens and (ii) rotation which changes the inclination of said light beam with respect to the optical axis of said objective lens.

11. The beam spot controlling apparatus as claimed in claim 10, wherein said optical system supporting member has an axis of rotation which is positioned eccentrically with respect to the optical axis of said objective lens.

12. The beam spot controlling apparatus as claimed in claim 9, further comprising an objective lens supporting member which supports said objective lens in a manner allowing the same to be driven in the focusing direction of said objective lens; and a tapered prism supporting member, which rotatably supports said tapered prism, separate from said objective lens supporting member.

13. The beam spot controlling apparatus as claimed in any one of claims 9 to 12, wherein the inclination-imparting portion of said tapered prism is positioned at or close to the back focal point of said objective lens.

14. A beam spot controlling apparatus for use with a recording medium, comprising:

(a) an objective lens movable in the focusing direction thereof for directing light onto the recording medium;

(b) a first tapered prism disposed in front of said objective lens, for imparting an inclination to a light beam incident on said first tapered prism;

(c) means for rotating said first tapered prism in a plane transverse to a light beam incident on said first tapered prism for changing the inclination of said light beam incident on said objective lens with respect to the optical axis of said objective lens;

(d) a housing; and (e) a second tapered prism disposed in front of said first tapered prism, having an inclined compensation surface with respect to said first tapered prism, said second tapered prism being secured to the housing.

15. The beam spot controlling apparatus as claimed in claim 14, further comprising an optical system supporting member which supports said objective lens and said first tapered prism, and is positioned to allow (i) forward and backward movement in the focusing direction of said objective lens and (ii) rotation which changes the inclination of said light beam with respect t the optical axis of said objective lens.

16. The beam spot controlling apparatus as claimed in claim 14, wherein said optical system supporting member has an axis of rotation which is positioned eccentrically with respect to the optical axis of said objective lens.

17. The beam spot controlling apparatus as claimed in claim 14, further comprising an objective lens supporting member which supports said objective lens in a manner allowing the same to be driven in the focusing direction of said objective lens; and a tapered prism supporting member, which rotatably supports said first tapered prism, separate from said objective lens supporting member.

18. The beam spot controlling apparatus as claimed in any one of claims 14 to 17, wherein the inclination-imparting portion of said tapered prism is positioned at or close to the back focal point of said objective lens.

19. An optical information processing apparatus for controlling a beam spot on a recording medium comprising:
   an objective lens positioned adjacent to the recording medium for focusing a light beam on the recording medium, said lens having an optical axis and a back focal point;
   a first tapered prism positioned adjacent to the objective lens for directing a light beam incident on the prism onto the objective lens, the first tapered prism having a beam deflecting portion located in close proximity to the back focal point of the objective lens; and
   rotating means for rotating the first tapered prism in a plane transverse to a light beam incident on said tapered prism for changing the inclination of the light beam incident on the objective lens with respect to the optical axis of the objective lens thereby moving a beam spot focused on the recording medium in response to the rotation of the first tapered prism.

20. The apparatus of claim 19 further comprising focusing means for moving the objective lens along the optical axis of the objective lens thereby focusing the light beams on the recording medium.

21. The apparatus of claim 19 further comprising a second tapered prism positioned adjacent to the first tapered prism for mutually compensating the inclination of light beam incident on the second prism and the inclination of light beam incident on the objective lens.

22. The apparatus of claim 19 wherein the first prism has an axis of rotation eccentrically positioned with respect to the optical axis of the objective lens.

23. The apparatus of claim 19 wherein the objective lens and the first prism are rotated as a unit.

* * * * *